US008285574B2

(12) United States Patent
Boss et al.

(10) Patent No.: US 8,285,574 B2
(45) Date of Patent: Oct. 9, 2012

(54) CONSTRAINED RESOURCE MANAGEMENT

(75) Inventors: Gregory J. Boss, Saginaw, MI (US); Rick A. Hamilton, II, Charlottesville, VA (US); Julianne F. Haugh, Austin, TX (US); Brian M. O'Connell, Research Triangle Park, NC (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 12/721,706

(22) Filed: Mar. 11, 2010

(65) Prior Publication Data

US 2011/0225016 A1 Sep. 15, 2011

(51) Int. Cl.
*G06Q 40/00* (2012.01)
(52) U.S. Cl. ..................... 705/7.11; 705/7.42
(58) Field of Classification Search .......... 705/10, 705/7.42, 7.11
See application file for complete search history.

(56) References Cited

U.S. PATENT DOCUMENTS

| | | | | |
|---|---|---|---|---|
| 5,630,070 | A * | 5/1997 | Dietrich et al. | 705/7.23 |
| 6,910,017 | B1 * | 6/2005 | Woo et al. | 705/7.29 |
| 7,103,565 | B1 * | 9/2006 | Vaid | 705/26.2 |
| 7,263,496 | B1 * | 8/2007 | Weigelt et al. | 705/7.25 |
| 7,869,505 | B2 * | 1/2011 | Rodriguez et al. | 375/240.12 |
| 8,155,072 | B2 * | 4/2012 | Warrillow et al. | 370/330 |
| 2003/0041002 | A1 * | 2/2003 | Hao et al. | 705/37 |
| 2003/0208392 | A1 * | 11/2003 | Shekar et al. | 705/8 |
| 2004/0098291 | A1 * | 5/2004 | Newburn | 705/8 |
| 2004/0128261 | A1 * | 7/2004 | Olavson et al. | 705/400 |
| 2005/0197887 | A1 * | 9/2005 | Zuerl et al. | 705/10 |
| 2005/0197896 | A1 * | 9/2005 | Veit et al. | 705/14 |
| 2005/0197897 | A1 * | 9/2005 | Veit et al. | 705/14 |
| 2006/0161504 | A1 * | 7/2006 | Walser et al. | 705/400 |
| 2007/0067656 | A1 * | 3/2007 | Ranganathan et al. | 713/320 |
| 2008/0125122 | A1 * | 5/2008 | Zhou et al. | 455/436 |
| 2008/0178019 | A1 | 7/2008 | McGrane et al. | |
| 2008/0306797 | A1 * | 12/2008 | Fayaz et al. | 705/8 |
| 2011/0238460 | A1 * | 9/2011 | Al-Dawsari et al. | 705/7.31 |

OTHER PUBLICATIONS

Deqiang Gan et el., A Price Competition Model for Power and Reserve Market Auctions, Science Direct, Electric Power Systems Research 70, 2004, pp. 187-193.

(Continued)

*Primary Examiner* — Thomas Dixon
*Assistant Examiner* — Benjamin S Fields
(74) *Attorney, Agent, or Firm* — Cantor Colburn LLP; Louis Percello

(57) ABSTRACT

Implementation of resource management services is provided. A method includes setting a price, per unit of a resource, for a defined time period and based upon a collective projected resource demand corresponding to resource consumption entities (RCEs). For the duration of the time period, the method includes iteratively performing: monitoring actual usage of the resource for each of the RCEs. If, in response to the monitoring, it is determined that a projected shortage exists for an RCE and a projected surplus exists for another RCE, the method includes re-allocating a number of projected surplus units of the resource from the RCE having the projected surplus to the other RCE having the projected shortage. If, in response to the monitoring, it is determined that a projected shortage exists for an RCE and no projected surplus exists for any of the other RCEs, the method includes acquiring additional units of the resource.

20 Claims, 3 Drawing Sheets

OTHER PUBLICATIONS

Wikipedia, [online]; [retrieved Feb. 23, 2010]; retrieved from Internet http://en.wikipedia.org/wiki/Electricity_market "Electricity Market", Wikipedia Online.

Energy Pulse, [online]; [retrieved on Feb. 23, 2010]; retrieved from the Internet http:www.energypulse.net/centers/article/article_print.cfm?a_id=1181 Len Gould, Independant Market for Every Utility Customer Part 2—Market Operation, EnergyPulse.net, Jan. 2006.

Hewlett-Packard, [online]; [retrieved on Feb. 23, 2010]; retrieved from the internet http://www.hpl.hp.com/news/2005/jul-sep/reservations.html Simon Firth, Riding the Peaks: Market-Based Systems Help Manage Demand, Hewlett-Packard Labs, Aug. 2005.

* cited by examiner

CONSTRAINED RESOURCE MANAGEMENT

BACKGROUND

The present invention relates to resource management, and more specifically, to constrained resource management services.

As industrialized societies continue to grow in an ever-changing global economy, more and more demands are placed on natural resources (e.g., water, petroleum, minerals, air). Over-consumption of these limited resources, as well as the effects this consumption has on the environment, has understandably become an increasing concern among various individuals, businesses, and organizations which, as a result, are seeking to discover new ways to better manage and preserve them.

One example of a constrained resource is electricity. In the United States, electrical power may be produced from natural resources by a coalition of providers via power plants and then distributed over one or more grids. Alternatively, power may be produced and distributed without a grid via, e.g., independent wind farms or solar cells. In a grid architecture, power from one grid may be freely transferred within the grid, but typically may only be transferred to another grid in limited amounts. As electric power cannot easily be stored, in order to meet demand different types of power plants contribute to the grid. Large, very efficient (and clean) power plants (e.g., nuclear power plants and large fossil-fuel power plants) are heavily relied upon and, therefore, may be operated around the clock. Due in part to their size, these power plants are not easily shut down and restarted. As a result, they are generally considered to be unsuitable for meeting intermittent demand peaks. Medium size power plants satisfy a portion of the nation's bulk energy demand and can be brought on-line in a reasonable amount of time to meet predictable, medium-term variation in power demand. Smaller power plants, such as hydroelectric plants and small size fossil fuel plants can be brought on-line quickly, and may be used to meet intermittent peaks in power demand. However, smaller fossil fuel power plants are typically less efficient and more polluting than larger power plants. Also, energy produced by small power plants is often sold through an auction (spot market) and can be on the order of 100 times more expensive than the energy produced by larger power plants. Finally, power plants vary in their method of electric power production. For example, some consume fossil fuels and create waste that may harm the environment, while other, so called "green" plants, use renewable energy such as solar, wind, or water to generate electricity.

In an effort to handle changes in demand, peaking power plants (also known as "peaker" plants) have been used. Peaker plants are power plants that generally run only when there is a high demand, known as peak demand, for electricity. The time that a peaker plant operates may be many hours a day or as little as a few hours per year, depending on the condition of the region's electrical grid. It is expensive to build an efficient power plant, so if a peaker plant is only going to be run for a short or highly variable time, it does not make economic sense to make it as efficient as a base load power plant. In addition, the equipment and fuels used in base load plants are often unsuitable for use in peaker plants because the fluctuating conditions would severely strain the equipment. For these reasons, nuclear, geothermal, waste-to-energy, coal, and biomass plants are rarely, if ever, operated as peaker plants. Peaker plants are generally gas turbines that burn natural gas. A few burn petroleum-derived liquids, such as diesel oil and jet fuel, but they are usually more expensive than natural gas, so their use is limited.

Presently, it is difficult for power providers to estimate the amount of power required for current, future and near future operations. As a result, less efficient peaker plants may be brought on-line, which may be more damaging to the environment than other power producing methodologies. Due to the above-mentioned costs and benefits of various types of power-producing plants, the challenges of producing power with minimal environmental and financial impact are heightened, particularly when factoring in the difficulties of forecasting consumer demand, which can drastically fluctuate based upon many unknown or unforeseen circumstances.

A need therefore exists to provide a way to manage the production and consumption of resources while minimizing its environmental and financial impact.

SUMMARY

According to one embodiment of the present invention, a method for implementing resource management services is provided. The method includes setting a price, per unit of a resource, for a defined time period and based upon a collective projected resource demand corresponding to resource consumption entities (RCEs). For the duration of the time period, the method includes iteratively performing: monitoring actual usage of the resource for each of the RCEs. If, in response to the monitoring, it is determined that a projected shortage exists for an RCE and a projected surplus exists for another RCE, the method includes re-allocating a number of projected surplus units of the resource from the RCE having the projected surplus to the other RCE having the projected shortage. If, in response to the monitoring, it is determined that a projected shortage exists for an RCE and no projected surplus exists for any of the other RCEs, the method includes acquiring additional units of the resource.

According to another embodiment of the present invention, a system for implementing resource management services is provided. The system includes a host system computer and an application executing on the host system computer. The application implements a method. The method includes setting a price, per unit of a resource, for a defined time period and based upon a collective projected resource demand corresponding to resource consumption entities (RCEs). For the duration of the time period, the method includes iteratively performing: monitoring actual usage of the resource for each of the RCEs. If, in response to the monitoring, it is determined that a projected shortage exists for an RCE and a projected surplus exists for another RCE, the method includes re-allocating a number of projected surplus units of the resource from the RCE having the projected surplus to the other RCE having the projected shortage. If, in response to the monitoring, it is determined that a projected shortage exists for an RCE and no projected surplus exists for any of the other RCEs, the method includes acquiring additional units of the resource.

In a further embodiment of the present invention, a computer program product for implementing resource management services is provided. The computer program product includes a computer-readable storage medium having instructions embodied thereon, which when executed by a computer, cause the computer to implement a method. The method includes setting a price, per unit of a resource, for a defined time period and based upon a collective projected resource demand corresponding to resource consumption entities (RCEs). For the duration of the time period, the method includes iteratively performing: monitoring actual usage of the resource for each of the RCEs. If, in response to the monitoring, it is determined that a projected shortage exists for an RCE and a projected surplus exists for another RCE, the method includes re-allocating a number of projected surplus units of the resource from the RCE having the projected surplus to the other RCE having the projected shortage. If, in response to the monitoring, it is determined that a projected shortage exists for an RCE and no projected surplus exists for any of the other RCEs, the method includes acquiring additional units of the resource.

In yet a further embodiment of the present invention, a method for resource management implemented by a resource management application executing on a computer is provided. The method includes forecasting an amount of a resource that will be generated over a defined time period, receiving a projected resource demand for the resource from each of a number of resource consumption entities, and providing a centralized network hub for the number of resource consumption entities and a provider of the resource. The centralized network hub includes a user interface component of the resource management application configured to enable end users of the resource consumption entities to engage in an auction for the resource. The end users purchase blocks of the resource from the provider via the user interface. Each of the resource consumption entities monitors corresponding consumption of the resource throughout the time period and trades, via the centralized network hub, credits for purchased units of the resource among the end users based upon projected surpluses and projected shortages of the resource in response to the monitoring. The centralized hub is configured to enable the trading for the duration of the time period.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

DETAILED DESCRIPTION

In exemplary embodiments, management of constrained resources is provided. The exemplary resource management methods described herein facilitate production and consumption of constrained or limited resources (e.g., electrical power, natural gas, city water, etc.) while minimizing its environmental and financial impact. In one exemplary embodiment, methods enable users to create a dynamic market to buy, sell, trade, or auction credits for the consumption of resources (e.g., through a real-time trading platform or centralized hub).

Using electrical power generation as an example of the resource to be managed, alternative power generation methods may be employed in the absence of a traditional power grid. Moreover, while the resource management processes described herein are directed to electrical power as the resource to be managed, it will be appreciated by those skilled in the art that the exemplary resource management processes may be implemented for any constrained resource.

One reason that power suppliers experience difficulty in forecasting demand for power may be because consumers clear lack incentive and knowledge to budget power use or to assist the power supplier in forecasting future needs. As a result, the power provider lacks reliable information in balancing supply and demand, thereby introducing unpredictability into their planning processes. Moving to a system of power budgeting, as will be described herein, enables the power provider to better predict and manage how much power will be consumed. A power budgeting system also enables consumers to be aware of their total maximum power usage or spending before the power is used.

In an exemplary embodiment, a market system is provided to buy and sell power that has been allocated or reserved to consumers but not used within an expected amount of time. As noted above, it is difficult for the operators of the electric grid to accurately forecast future demand. As adding and removing capacity to keep up with fluctuations of demand is very expensive both environmentally and financially, the exemplary resource management methods assist grid power providers with their forecasting.

In an exemplary embodiment, the resource management methods include collecting fees from power consumers in advance of providing the resources. By pre-purchasing resources, consumers who accurately predict, budget, and manage their resource usage are rewarded with reduced prices. Likewise, providers of these resources are benefited, as they are able to sell resources economically in exchange for better predictions from consumers, thereby reducing operating costs.

Figure 1:
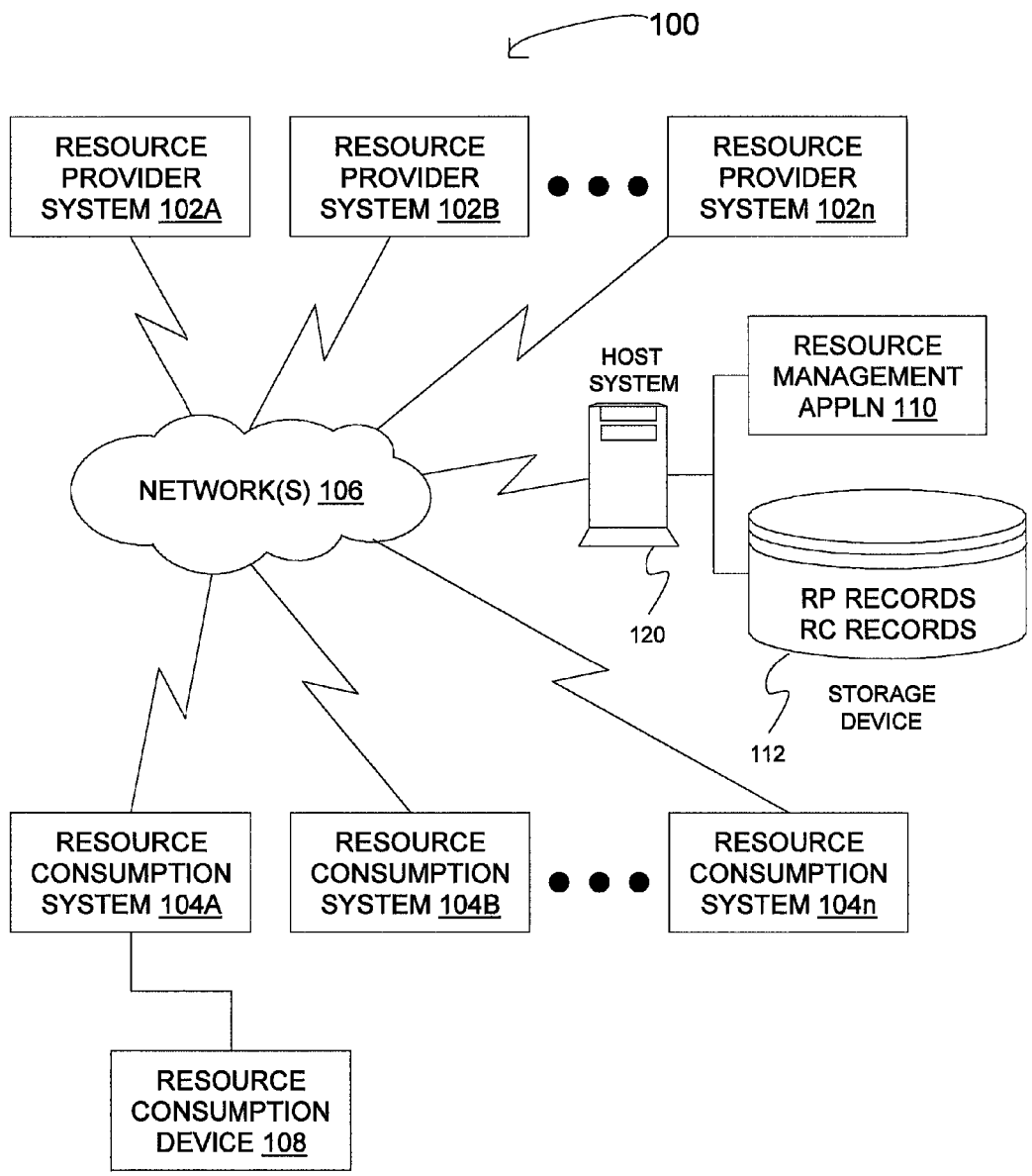
FIG. 1 depicts a block diagram of a system upon which resource management services may be implemented in an exemplary embodiment.

Turning now to FIG. 1, an exemplary system 100 for providing resource management services will now be described. As indicated above, for purposes of illustration, and by way of non-limiting example, the resources described herein refer to the generation and distribution of electrical power; however, it will be understood that the exemplary methods may be implemented for other budgeted or constrained resources, such as natural gas, city water, etc.

The system 100 of FIG. 1 includes resource provider systems 102A-102n in communication with a host system 120 and resource consumption systems 104A-104n over one or more networks 106.

The resource provider systems 102A-102n may include power plants that generate and distribute power over a defined grid or across grids (not shown). As provided herein, a grid refers to an interconnected electrical network that provides electricity for consumers within a defined region. In alternative exemplary embodiments, one or more of the resource provider systems 102A-102n may not have access to a power grid but rather generate power by means such as wind farm or solar cell technologies. The resource provider systems 102A-102n may each supply electrical power generated using various techniques, such as nuclear, fossil fuel, coal, hydroelectric, or renewable energy such as solar, wind or water generated electricity. One or more of the power providers of resource provider systems 102A-102n may be managed by a unique account created by the host system 120. In an exemplary embodiment, resource providers systems 102A-102n each include a computer processing device that communicates with the host system 120 (and optionally, with account holders represented as resource consumption systems 104A-104n) over one or more of the networks 106. The computer processing device may be implemented using a general-purpose computer executing a computer program for carrying out the processes described herein. Alternatively the computer processing device may be a high-speed computer, such as a mainframe computer that is capable of handling the volume of activities conducted between the resource provider system and its customers.

Host system 120 may be implemented by an entity (e.g., an application service provider (ASP)) that acts as a liaison between the resource provider systems 102A-102n and the resource consumption systems 104A-104n. In this embodiment, the ASP represents a third party entity whose customers are both the resource provider systems 102A-102n and the resource consumption systems 104A-104n and includes a centralized hub for providing the resource management services described herein. The host system 120 manages its customer accounts for resource providers and consumers as described further herein. In an alternate exemplary embodiment, the host system 120 may be operated by one or more of the resource provider systems 102A-102n, which in turn, offers the exemplary resource management services to other resource providers and resource consumers under a service agreement.

Using electrical power as the resource provided by the system 100 of FIG. 1, the resource consumption systems 102A-102n (also referred to herein as resource consumption entities) are consumers of the electrical power received from resource provider systems typically under an agreement. Resource consumption systems 102A-102n may be businesses and/or households, each of which is managed by the host system 120 via a unique account. Resource consumption systems 104A-104n consume electrical power via one or more resource consumption devices (e.g., resource consumption device 108). While only a single resource consumption device 108 is illustrated in FIG. 1, it will be understood that resource consumption systems 104A-104n may include any number of resource consumption devices 108.

Resource consumption device 108 may be any device or system within a resource consumption system 104 that consumes the resource provided by the resource provider systems 102A-102n, in this example, electrical power. Examples of resource consumption devices associated with a home account may include televisions, entertainment systems, dishwashers, clothes washers and dryers, HVAC systems, lighting, etc. In a business context, resource consumption devices may include computer devices, networks, and peripheral components, HVAC, business equipment or machinery, lighting, etc. Resource consumption devices, e.g., device 108, are communicatively coupled to a meter or similar device (not shown) that measures the amount of power usage consumed by the resource consumption devices 108 for a given account (e.g., one of resource consumption systems 104A-104n.

In an exemplary embodiment, resource consumption systems 104A-104n each includes a computer processing device that communicates with the host system 120 (and optionally, resource providers represented as resource provider systems 102A-102n) over one or more of the networks 106. Each computer processing device may be implemented using a general-purpose computer executing a computer program for carrying out the processes described herein. The computer processing device may be a personal computer (e.g., a lap top, a personal digital assistant). A portion of the resource management processes may be implemented by the computer processing device, e.g., by providing an applet to the computer processing device. In one exemplary embodiment, the computer processing device may be communicatively coupled to the meter, such that measured power usage information collected by the meter may be transferred from the meter to a corresponding power provider system 102 and/or the host system 120, via the computer processing device and one or more of the networks 106.

The host system 120 depicted in FIG. 1 may be implemented using one or more servers operating in response to a computer program stored in a storage medium accessible by the server. The host system 120 may operate as a network server (e.g., a web server) to communicate with network entities, such as the resource provider systems 102A-102n and the resource consumption systems 104A-104n. The host system 120 handles sending and receiving information to and from these network entities and can perform associated tasks.

Figure 3:
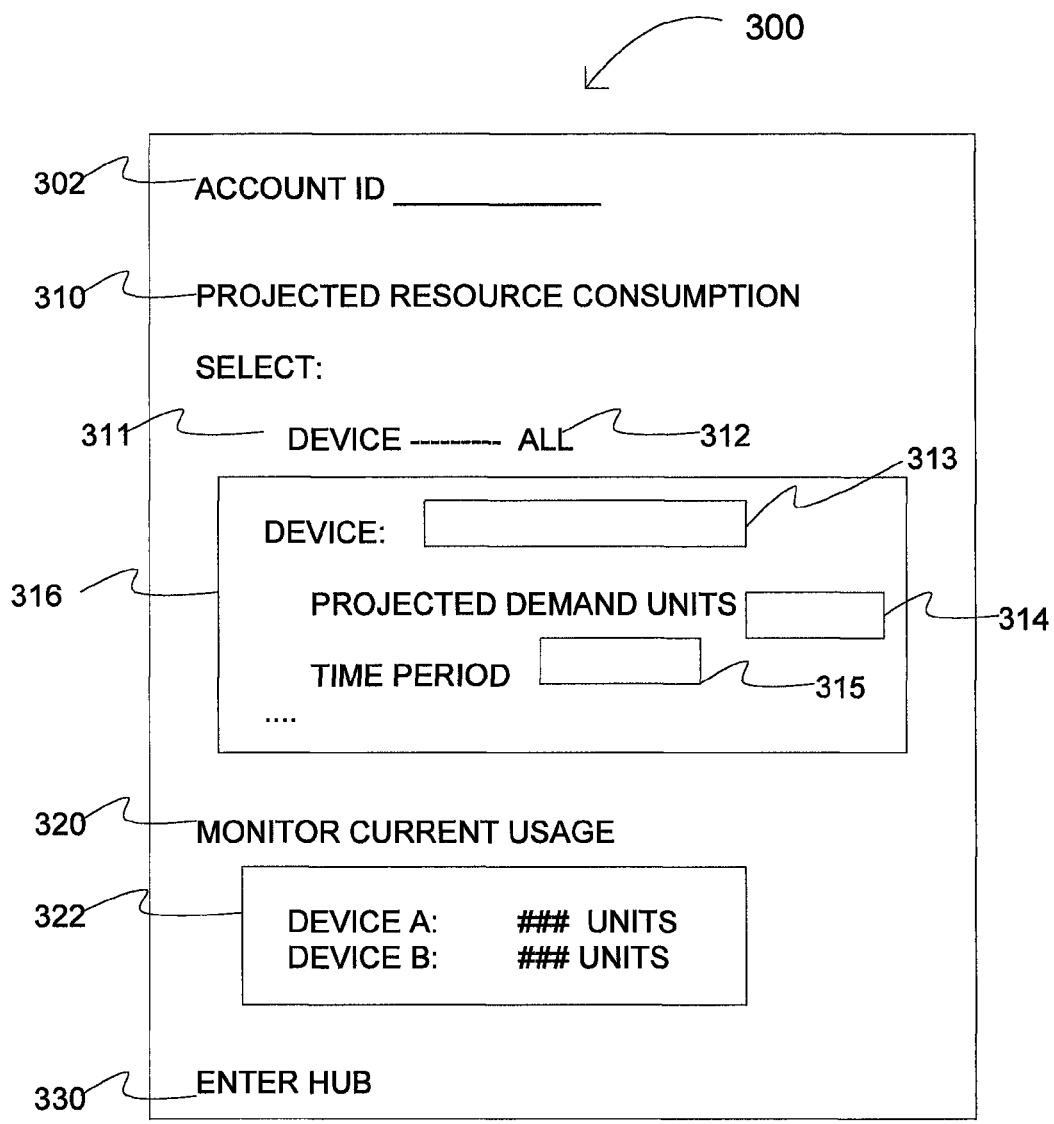
FIG. 3 is a user interface screen provided by the resource management services.

The host system 120 may also operate as an application server. The host system 120 executes one or more computer programs to provide the exemplary resource management services. As shown in FIG. 1, the host system 120 executes a messaging component (e.g., email server—not shown), as well as a resource management application 110 for implementing the resource management services described herein. In an exemplary embodiment, the resource management application 110 includes a user interface component (a sample user interface screen of the user interface component is shown in FIG. 3), which enables the host system 120 to operate as a hub among the various network entities of FIG. 1. Processing may be shared between the host system 120 and computer processing devices of one or more of the resource provider systems 102A-102n (and optionally, with computer processing devices of one or more of the resource consumption systems 104A-104n), e.g., by providing an application (e.g., java applet) to these systems. Alternatively, the computer processing devices of resource provider systems 102A-102n (and optionally, the computer processing devices of the resource consumption systems 104A-104n) may include stand-alone software applications for performing a portion of the processing described herein. As previously described, it is understood that separate servers may be utilized to implement the network server functions and the application server functions. Alternatively, the network server and the application server may be implemented by a single server executing computer programs to perform the requisite functions.

In an exemplary embodiment, storage device 112 stores resource provider system records and resource consumption system records, which identify their respective accounts with the host system 120. The storage device 112 may also house other information used in providing the resource management services. The storage device 112 may be implemented using a variety of devices for storing electronic information. It is understood that the storage device 112 may be implemented using memory contained in the host system 120 or that it may be a separate physical device (e.g., as shown in FIG. 1). The storage device 112 is logically addressable as a consolidated data source across a distributed environment that includes networks 106. Information stored in the storage device 112 may be retrieved and manipulated via the host system 120 and, optionally, one or more of network entities (e.g., resource provider systems 102A-102n and resource consumption entities 104A-104n). The account records stored in storage device 112 may include, e.g., identification and contact information related to customers of the resource management services. Access control with respect to the records and other information stored in storage device 112 may be managed via an authentication mechanism (e.g., firewall) configured by the host system 120 to create and manage the market (hub) described herein. In providing a centralized hub for access by the resource provider systems 102A-102n and the resource consumption systems 104A-104n, the account records may be generated, accessed, and processed by the resource management application 110 as will be described further herein.

In an exemplary embodiment, networks 106 provide the capability of enabling communications among the host system 120, resource provider systems 102A-102n, and resource consumption systems 102A-102n. For example, messaging, account set up and maintenance, configuration selections (e.g., selections relating to projected resource demand and follow up demand requests), and resource consumption views may be provided over the networks 106. In addition, networks 106 may provide the capability of enabling the monitoring of resources used by the resource consumption systems 104A-104n via their respective resource consumption devices (e.g., device 108), computer processing devices, and meters. For example, actual usage data associated with a resource consumption device 108 may be captured by its respective meter, which in turn transmits the data to the computer processing device at the resource consumption system 104. The computer processing device may then transmit the data over the networks 106 to a desired destination, such as host system 120 and/or corresponding one or more of the resource provider systems 104A-104n.

The networks 106 may be any type of known networks including, but not limited to, a wide area network (WAN), a local area network (LAN), a global network (e.g. Internet), a virtual private network (VPN), and an intranet. The network 106 may be implemented using a wireless network or any kind of physical network implementation known in the art. A network entity, e.g., one or more of resource provider systems 102A-102n and/or one or more of resource consumption systems 104A-104n may be coupled to the host system 120 through multiple networks (e.g., intranet and Internet) so that not systems 102A-102n and 104A-104n are coupled to one another or to the host system 120 through the same network.

The configuration exemplified in FIG. 1 illustrates one example of a system that employs the resource management methods described herein. It will be understood that variations to the system 100 of FIG. 1 may be made in order to realize the advantages of the exemplary embodiments.

In an exemplary embodiment, multiple resource consumption systems (e.g., any number of resource consumption systems 104A-104n) collectively form a community of resource consumers as described herein. In one exemplary embodiment, once an account is established for the resource consumption system 104, the host system 120 prompts the account holder to provide a projected resource demand (e.g., given in units, such as kilowatt hour) for a given time period via, e.g., the user interface component (see FIG. 3). In an alternative exemplary embodiment, the host system 120 may suggest to the resource consumer, or may autonomously determine and assign to the account, a projected resource demand for the defined time period based upon various criteria, such as historical resource usage, environmental factors such as weather conditions predicted for the defined time period, and/or information supplied by the resource consumer (e.g., the resource consumer notifies the host system that one or more of the resource consumption devices 108 associated with the account will be non-operable for a period of time due to vacation, hospitalization, or other events).

The host system 120 acquires projected resource demand for other resource consumption systems 104A-104n for the same time period and uses this collective projected demand to calculate a per unit price for the resource. Those resource consumption systems 104A-104n providing a projected resource demand for the time period, which are then used to form the aggregate projected demand, are collectively referred to as the community of resource consumers. The host system 120 communicates this projected resource demand information, e.g., either individually by resource consumption system account or collectively by the community, to corresponding resource provider systems 102A-102n, which in turn generates (and reserves for the community) an amount of the resource equal to the aggregate projected demand. These, and other features, of the resource management services are described further herein.

Figure 2:
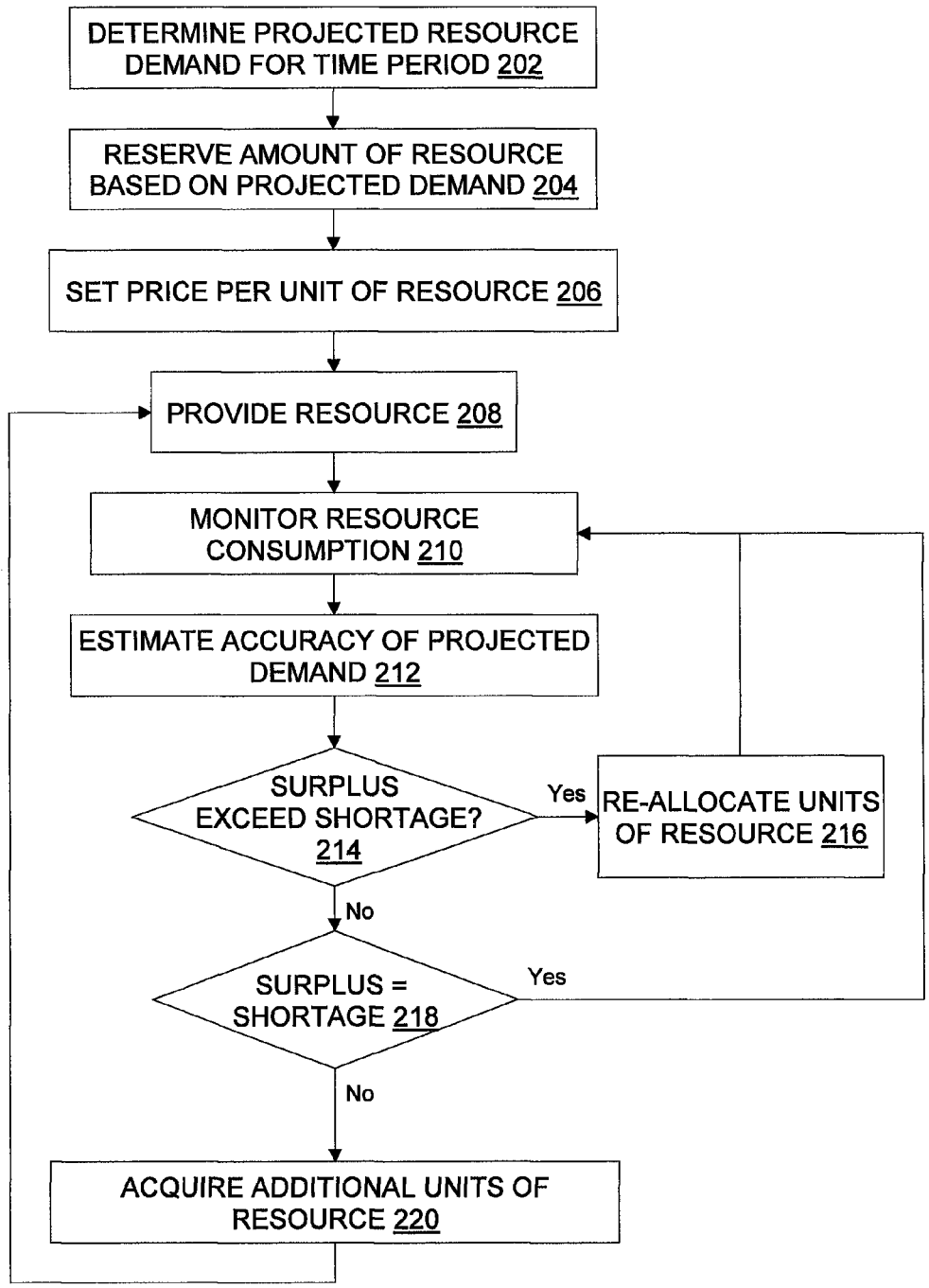
FIG. 2 illustrates a flow diagram describing a process for implementing resource management services in an exemplary embodiment.

Turning now to FIG. 2, an exemplary process for implementing the resource management services will now be described. The processes described in FIG. 2 are directed to an embodiment in which an electrical grid architecture is employed. In one exemplary embodiment, an end user of a computer processing device of one of resource consumption systems 104A-104n may access the user interface component of the resource management application 110 to initiate the resource management services. The user interface component may be employed to create a new account, configure selected projected resource demand data, request additional units of the resource, supply projected surpluses of the units to the community, view consumption data, and other activities as described further herein. For purposes of illustration, it is assumed that an end user has already created an account for the resource management services, a corresponding account record is stored in the storage device 112 of FIG. 1, and the user now desires to acquire units of the resource for a future time. The user accesses the hub via the user interface component of the resource management application 110 and a user interface screen 300 shown in FIG. 3 is provided to the end user.

At step 202, the resource management application 110 determines a projected resource demand for the end user for a defined time period. The resource management application 110 may be configured to receive the projected demand information over a time period that is defined by any time interval (e.g., minutes, hours, days). In one example, a time period may be defined as a fifteen-minute period that begins at 09:00:00 and ends at 09:15:00 on a given day.

The projected resource demand may be determined using one or more techniques. For example, as shown in FIG. 3, the projected resource demand may be submitted by the end user of a resource consumption entity 104 via the user interface component. Additionally, the end user may specifically project resource demand for a time period on either of a device basis or as an aggregate of all devices associated with the account. Alternatively, or in combination with one or more of the above, the projected resource demand may be estimated by a power supplier entity and suggested to the end user based on a number of criteria. For example, the power supplier entity may be project demand using historical usage data associated with the resource with respect to the resource consumption entity, external factors projected to impact resource consumption during the defined time period, and/or data provided by the end user associated with the resource consumption entity. This calculation may be performed by the power supplier system autonomously, upon request by the end user, specifically by the end user, or a combination thereof. As shown in FIG. 3, the end user's account is reflected via an ACCOUNT ID field 302. The end user selects a menu option PROJECTED RESOURCE CONSUMPTION 310, followed by selecting either DEVICE 311 (to indicate projected demand per each device in the account) or ALL 312 (to indicate all devices in the account). As shown in FIG. 3, the end user has selected DEVICE 311, in which a window 316 is provided in response to the selection. In the window 316, the end user enters device information in a field 313, a projected demand in units in field 314 (e.g., kilowatt hours), and optionally, a time period in field 315 (e.g., 15 minutes beginning at 09:00:00 on Monday, February 15$^{th}$. The end user may continue to enter this information in window 316 for other devices associated with the account.

The resource management application 110 collects projected resource demand from a number of the resource consumption entities 104A-104n (e.g., the community) in a manner similar to that described above with respect to the end user.

The host system 120 sends this projected demand information to resource providers (e.g., one or more of resource provider systems 102A-102n). These provider systems may be provided with access to projected resource demand based upon account identifiers (provider and consumer identifications) that link, e.g., one or more of resource provider systems 102A-102n to a particular resource consumption system according to some pre-defined criteria. In one embodiment, a resource consumption system may be linked to one or more resource providers from which it receives resources by a defined grid or similar geographic criteria.

At step 204, the host system 120 may instruct corresponding resource provider systems 102A-102n, via resource application 110, to reserve an amount of the resource commensurate to the collective projected resource demand received from the community. As used herein, the term "reserve" may include setting aside existing resource supply or generating an amount of the resource equal to the projected demand before and/or during the time period associated with the project demand.

At step 206, the corresponding resource provider systems may set a price, per unit of the resource, for its usage during the associated time period based upon the collective projected resource demand. This price per unit may be calculated using any known techniques in the relevant market. In an exemplary embodiment, the resource provider systems collect fees assessed for the projected resource demand based upon the price set for the defined time period, from each of the corresponding resource consumption systems 102A-102n. These fees may be collected from each of the resource consumption entities in advance of providing the resource. In an exemplary embodiment, the fees may be collected by the resource provider systems 102A-102n directly from its respective resource consumption systems. Alternatively, the fees may be collected from the resource consumption entities by the host system 120 on behalf of the resource provider systems 102A-102. The fees due and/or collected may be tracked via the corresponding resource provider system accounts and resource consumption system accounts. In a further exemplary embodiment, the application 110 may issue credits or tokens to resource consumption systems 104A-104n in response to collecting fees for projected resource consumption. The total credits issued to an account include a value that reflects the price per unit set for the resources factoring in the projected demand. If a credits system is used, end users of the resource management services may buy, sell, and trade credits (units of the resource) via the hub according to a current value of the credits attributed to the end users.

Returning now to FIG. 2, the resource provider systems 102A-102n provide the resources to the resource consumption systems 104A-104n in accordance with their individual projected demands at step 208. In an exemplary embodiment, steps 208-220 are iteratively performed for the duration of the defined time period.

At step 210, actual usage of the resource is monitored, and quantified by the unit, for each of the respective resource consumption systems 104A-104n. In an exemplary embodiment, the actual usage of the resource may be monitored by the resource provider systems which provide the resources and/or the host system 120 via, e.g., a meter device and communications elements at the resource consumption system, which then transmit the usage data to the respective resource provider systems and/or the host system 120. The actual usage may be monitored (and quantified by the unit of used resources) for each of the resource consumption entities. In addition, the actual usage (i.e., consumption) may be monitored by an end user of the resource management services corresponding to the resource consumption system 104. As shown in FIG. 3, e.g., the end user selects a MONITOR CURRENT USAGE option 320 from the user interface screen 300 and the resource management application 110 presents a window 322, which displays usage data to the end user (in this example, the usage data is presented by device). Optionally, if the end user earlier selected ALL 312 and entered projected demand for all devices as an aggregate number, the window 322 may present the total resource usage for the end user account.

At step 212, the resource management application 110 estimates the continued accuracy of the projected resource demand for each of the resource consumption entities based on actual usage data derived in response to the monitoring. The accuracy may be determined by comparing projected resource demand for a resource consumption system 104 with the actual usage data acquired in response to the monitoring, and estimating future resource consumption needs or surpluses over the remaining time period.

At step 214, the resource management application 110 determines if an estimated surplus exceeds an estimated shortage that was projected in response to estimating the accuracy of the projected demand. In an exemplary embodiment, this calculation is performed on an individual (e.g., account) level and an aggregate (community) level. That is, the resource management application 110 determines if a collective projected surplus exceeds a collective projected shortage of the resource for the community. If so, at step 216 the resource management application 110 re-allocates a number of the projected surplus units of the resource that were originally reserved for one or more of the resource consumption entities 104A-104n to one or more others of the resource consumptions entities 104A-104n that have been projected to incur a shortage of units of the resource. For example, 20 projected surplus units reserved for a first resource consumption system 104A may be re-allocated (e.g., via the exchange of credits) to a second resource consumption system 104B. In addition, a number of projected surplus units for a single resource consumption system may be divided up and re-allocated to multiple resource consumption systems.

Various techniques for performing this re-allocation may be used. For example, the re-allocation may be performed autonomously by the corresponding resource provider systems 102A-102n via the host system 120 without any input of the end users of the resource consumption systems 102A-102n. Alternatively, an end user of a resource consumption system, e.g., in response to monitoring consumption via the user interface screen 300 of FIG. 3, may access the hub by selecting a menu option ENTER HUB 330 on the user interface screen 300. In an exemplary embodiment, the hub and user interface are configured via the resource management application 110 to enable end users of the resource consumption systems 102A-102n to buy, sell, auction and/or trade units of the resource. For example, once entering the hub, resource consumption entities having projected surplus units may sell the projected surplus units to resource consumption entities having a projected shortage. In addition to, or alternatively, resource consumption entities having projected surplus units may sell the projected surplus units back to a resource provider system that originally provided the resource. In this embodiment, the hub and user interface may be configured to enable the resource provider system to re-sell the projected surplus units purchased from the resource consumption system via the hub. In another example, the hub and user interface may be configured to enable resource consumption entities having a projected shortage to purchase projected surplus units offered via the hub, enable resource consumption entities having projected surplus units to auction the projected surplus units via the hub, and/or enable resource consumption entities having projected surplus units to trade the projected surplus units with other resource consumption entities via the hub.

Returning to FIG. 2, if the projected surplus does not exceed a projected shortage, it is determined if the projected surplus equals the projected shortage at step 218. If so, this means that the projected demands provided in step 202 are accurate, i.e., the consumption equals the projected demand for the current time period being monitored. In this instance, the process returns to step 210 and the resource usage continues to be monitored.

If the projected surplus does not equal the projected shortage at step 218, this means there is insufficient projected surplus of resource throughout the community to perform any needed re-allocations. That is, the projected shortage exceeds the projected surplus for the community. In this instance, additional units of the resource are acquired from corresponding resource provider systems 102A-102n at step 220 and provided to the respective resource consumption systems 104A-104n at step 208. The additional units acquired may be provided to the resource consumption system at a new set price per unit to reflect the disparity in the projected demand versus actual consumption, as well as to account for fluctuations in costs per unit as a result of changes in demand. This new price, particularly if it is higher than the previous set price, may encourage the end user to re-evaluate criteria used in estimating future projected demand for the account.

Additional units of the resource may be acquired using various techniques. For example, the additional units may be autonomously acquired via the resource management application 110 in response to determining the projected shortage and without any input and/or knowledge of the end user of the resource consumption system receiving the additional units. In an alternative exemplary embodiment, the end user of a resource consumption system may enter the hub via the ENTER HUB option 330 of user interface screen 300 and request additional units of the resource. The amount of additional units may be specifically provided by the end user or may be estimated by the resource management application 110, e.g., based on the end user's historical usage and the amount of time remaining in the defined time period. In response to the request, the resource management application 110 may retrieve the resource consumption system's record from storage device 112, review the history of projected demand information provided by the end user via the PROJECTED RESOURCE CONSUMPTION option 310 (as well as the historical usage data), generate a request for the corresponding resource provider system 102 for the additional units, and determine if any further action should be taken. For example, based upon the historical usage data the resource management application 110 may suggest that the end user schedule an inspection of one or more resource consumption devices 108 that appear to be consuming more resources over time absent any specific cause. Alternatively, this information may be sent to the corresponding resource provider system, which in turn contacts the end user. In one exemplary embodiment, the hub and user interface component may be configured via the resource management application 110 to enable parties to schedule an inspection or perform other similar actions via the hub.

As indicated above, the resource management services may be provided over a system that does not employ a grid (e.g., independently run wind farms or solar collection facilities). The following exemplary embodiment describes a process for providing the resource management services over a system does not include a grid. The following processes may be implemented at least in part via resource provider systems, resource consumption systems, and networks similar to those described in FIG. 1. In addition, the processes may be performed at least in part via the user interface component and the resource management application 110, which may be modified in minor respects.

A time period is established (e.g., one hour between 15:00:00 to 16:00:00 for the current day). Operators of the system (e.g., wind or solar) forecast an amount of power (e.g., 200 kilowatt hours) that will be generated and available during that time period, based on factors such as weather predictions. End users or consumers of power estimate their power requirements for the time period. A spot market is created (e.g., similar to the hub described above), where end users bid for and purchase blocks of the limited amount of power for this time period. The resource management application 110 tracks the how much power each consumer has purchased. After the time period has started, each consumer tracks its own actual usage against expected usage and provides this information to the resource management application 110. Any consumer who projects a surplus may offer this surplus on the market (hub), e.g., via the user interface component. Likewise, other consumers who project a shortage may enter the hub and request additional units from others who have a projected surplus. This trading may be continued for as long as the period of time defined above.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the preferred embodiment to the invention has been described, it will be understood that those skilled in the art, both now and in the future, may make various improvements and enhancements which fall within the scope of the claims that follow. These claims should be construed to maintain the proper protection for the invention first described.

What is claimed is:

1. A method for managing constrained resources via a computer, the method comprising: setting a price, per unit of a resource, based upon a collective projected resource demand corresponding to a plurality of resource consumption entities, the price set for a defined period of time, and an amount of the resource equal to the collective projected resource demand is reserved for the plurality of resource consumption entities; and for the duration of the defined time period, iteratively performing: monitoring actual usage of the resource, quantified by the unit, for each of the resource consumption entities; upon a determination in response to the monitoring, that a projected shortage exists for at least one of the resource consumption entities and a projected surplus exists for at least one other of the resource consumption entities, re-allocating a number of projected surplus units of the resource from corresponding one or more resource consumption entities having the projected surplus to corresponding one or more other resource consumption entities having the projected shortage; and upon a determination in response to the monitoring, that a projected shortage exists for at least one of the resource consumption entities and no projected surplus exists for any of the other resource consumption entities, acquiring additional units of the resource, wherein a number of the additional units acquired compensates for the projected shortage within the defined time period, and the number of additional units are provided at a new set price that is calculated based upon a demand for the resource at the time the additional units are acquired.

2. The method of claim 1, further comprising determining projected resource demand for each of the plurality of resource consumption entities over the defined time period, projected resource demand determined by at least one of:
   historical usage data associated with the resource with respect to the resource consumption entity;
   external factors projected to impact resource consumption during the defined time period; and
   data provided by an end user associated with the resource consumption entity.

3. The method of claim 2, wherein each of the resource consumption entities includes at least one resource consumption device, and wherein:
   determining the projected resource demand for each of the plurality of resource consumption entities includes determining a projected resource demand for selected one or more resource consumption devices associated with a resource consumption entity;
   monitoring the actual usage of the resource comprises monitoring the actual usage of the resource, quantified by the unit, for each of the selected one or more resource consumption devices associated with the resource consumption entity; and
   re-allocating the number of projected surplus units of the resource originally reserved for the at least one other of the resource consumption entities to the at least one of the resource consumption entities having the projected shortage comprises re-allocating the number of projected surplus units of the resource to corresponding selected one or more resource consumption devices associated with the at least one of the resource consumption entities having the projected shortage.

4. The method of claim 1, further comprising:
   collecting fees assessed for the projected resource demand based upon the price set for the defined time period, the fees collected from each of the resource consumption entities in advance of providing the resource.

5. The method of claim 1, wherein re-allocating a number of projected surplus units of the resource from corresponding one or more resource consumption entities having the projected surplus to corresponding one or more other resource consumption entities having the projected shortage is implemented by providing a centralized network hub and user interface configured to perform at least one of:
   enable resource consumption entities having projected surplus units to sell the projected surplus units to resource consumption entities having a projected shortage;
   enable resource consumption entities having projected surplus units to sell the projected surplus units back to a resource provider system that originally provided the resource, the hub and user interface configured to enable the resource provider system to re-sell the projected surplus units via the hub;
   enable resource consumption entities having a projected shortage to purchase projected surplus units offered via the hub;
   enable resource consumption entities having projected surplus units to auction the projected surplus units via the hub; and
   enable resource consumption entities having projected surplus units to trade the projected surplus units with other resource consumption entities via the hub.

6. The method of claim 1, wherein monitoring the actual usage of the resource includes receiving actual usage data from each of the plurality of resource consumption entities and determining accuracy of the corresponding projected resource demand by comparing the corresponding projected resource demand with the actual usage data, the accuracy determined by estimating future resource consumption over the defined time period and calculating any projected shortages or surpluses resulting from the estimating.

7. A system for managing constrained resources, comprising:
 a host system computer; and
 an application executing on the host system computer, the application implementing a method, the method comprising:
  setting a price, per unit of a resource, based upon a collective projected resource demand corresponding to a plurality of resource consumption entities, the price set for a defined period of time, and an amount of the resource equal to the collective projected resource demand is reserved for the plurality of resource consumption entities; and
  for the duration of the defined time period, iteratively performing:
   monitoring actual usage of the resource, quantified by the unit, for each of the resource consumption entities;
   upon a determination, in response to the monitoring, that a projected shortage exists for at least one of the resource consumption entities and a projected surplus exists for at least one other of the resource consumption entities, re-allocating a number of projected surplus units of the resource from corresponding one or more resource consumption entities having the projected surplus to corresponding one or more other resource consumption entities having the projected shortage; and
   upon a determination, in response to the monitoring, that a projected shortage exists for at least one of the resource consumption entities and no projected surplus exists for any of the other resource consumption entities, acquiring additional units of the resource, wherein a number of the additional units acquired compensates for the projected shortage within the defined time period, and the number of additional units are provided at a new set price that is calculated based upon a demand for the resource at the time the additional units are acquired.

8. The system of claim 7, wherein the application further implements:
 determining projected resource demand for each of the plurality of resource consumption entities over the defined time period, projected resource demand determined by at least one of:
 historical usage data associated with the resource with respect to the resource consumption entity;
 external factors projected to impact resource consumption during the defined time period; and
 data provided by an end user associated with the resource consumption entity.

9. The system of claim 8, wherein each of the resource consumption entities includes at least one resource consumption device, and wherein:
 determining the projected resource demand for each of the plurality of resource consumption entities includes determining a projected resource demand for selected one or more resource consumption devices associated with a resource consumption entity;
 monitoring the actual usage of the resource comprises monitoring the actual usage of the resource, quantified by the unit, for each of the selected one or more resource consumption devices associated with the resource consumption entity; and
 re-allocating the number of projected surplus units of the resource originally reserved for the at least one other of the resource consumption entities to the at least one of the resource consumption entities having the projected shortage comprises re-allocating the number of projected surplus units of the resource to corresponding selected one or more resource consumption devices associated with the at least one of the resource consumption entities having the projected shortage.

10. The system of claim 7, wherein the application further implements:
 collecting fees assessed for the projected resource demand based upon the price set for the defined time period, the fees collected from each of the resource consumption entities in advance of providing the resource.

11. The system of claim 7, wherein re-allocating a number of projected surplus units of the resource from corresponding one or more resource consumption entities having the projected surplus to corresponding one or more other resource consumption entities having the projected shortage is implemented by the application via a centralized network hub and user interface configured to perform at least one of:
 enable resource consumption entities having projected surplus units to sell the projected surplus units to resource consumption entities having a projected shortage;
 enable resource consumption entities having projected surplus units to sell the projected surplus units back to a resource provider system that originally provided the resource, the hub and user interface configured to enable the resource provider system to re-sell the projected surplus units via the hub;
 enable resource consumption entities having a projected shortage to purchase projected surplus units offered via the hub;
 enable resource consumption entities having projected surplus units to auction the projected surplus units via the hub; and
 enable resource consumption entities having projected surplus units to trade the projected surplus units with other resource consumption entities via the hub.

12. The system of claim 7, wherein monitoring the actual usage of the resource includes receiving actual usage data from each of the plurality of resource consumption entities and determining accuracy of the corresponding projected resource demand by comparing the corresponding projected resource demand with the actual usage data, the accuracy determined by estimating future resource consumption over the defined time period and calculating any projected shortages or surpluses resulting from the estimating.

13. A computer program product for managing constrained resources, the computer program product comprising a computer-readable storage medium having instructions embodied thereon, which when executed by a computer, cause the computer to implement a method, the method comprising:
 setting a price, per unit of a resource, based upon a collective projected resource demand corresponding to a plurality of resource consumption entities, the price set for a defined period of time, and an amount of the resource equal to the collective projected resource demand is reserved for the plurality of resource consumption entities; and
 for the duration of the defined time period, iteratively performing:
 monitoring actual usage of the resource, quantified by the unit, for each of the resource consumption entities;
 upon a determination, in response to the monitoring, that a projected shortage exists for at least one of the resource consumption entities and a projected surplus exists for at least one other of the resource consumption entities, re-allocating a number of projected surplus units of the resource from corresponding one or more resource consumption entities having the projected surplus to corresponding one or more other resource consumption entities having the projected shortage; and upon a determination, in response to the monitoring, that a projected shortage exists for at least one of the resource consumption entities and no projected surplus exists for any of the other resource consumption entities, acquiring additional units of the resource, wherein a number of the additional units acquired compensates for the projected shortage within the defined time period, and the number of additional units are provided at a new set price that is calculated based upon a demand for the resource at the time the additional units are acquired.

14. The computer program product of claim 13, further comprising instructions for implementing:

determining projected resource demand for each of the plurality of resource consumption entities over the defined time period, projected resource demand determined by at least one of:

historical usage data associated with the resource with respect to the resource consumption entity;

external factors projected to impact resource consumption during the defined time period; and data provided by an end user associated with the resource consumption entity.

15. The computer program product of claim 14, wherein each of the resource consumption entities includes at least one resource consumption device, and wherein:

determining the projected resource demand for each of the plurality of resource consumption entities includes determining a projected resource demand for selected one or more resource consumption devices associated with a resource consumption entity;

monitoring the actual usage of the resource comprises monitoring the actual usage of the resource, quantified by the unit, for each of the selected one or more resource consumption devices associated with the resource consumption entity; and re-allocating the number of projected surplus units of the resource originally reserved for the at least one other of the resource consumption entities to the at least one of the resource consumption entities having the projected shortage comprises re-allocating the number of projected surplus units of the resource to corresponding selected one or more resource consumption devices associated with the at least one of the resource consumption entities having the projected shortage.

16. The computer program product of claim 13, further comprising instructions for implementing:

collecting fees assessed for the projected resource demand based upon the price set for the defined time period, the fees collected from each of the resource consumption entities in advance of providing the resource.

17. The computer program product of claim 13, wherein re-allocating a number of projected surplus units of the resource from corresponding one or more resource consumption entities having the projected surplus to corresponding one or more other resource consumption entities having the projected shortage is implemented via a centralized network hub, the method further comprising performing at least one of:

enable resource consumption entities having projected surplus units to sell the projected surplus units to resource consumption entities having a projected shortage;

enable resource consumption entities having projected surplus units to sell the projected surplus units back to a resource provider system that originally provided the resource, the resource provider system re-selling the projected surplus units via the hub;

enable resource consumption entities having a projected shortage to purchase projected surplus units offered via the hub;

enable resource consumption entities having projected surplus units to auction the projected surplus units via the hub; and enable resource consumption entities having projected surplus units to trade the projected surplus units with other resource consumption entities via the hub.

18. The computer program product of claim 13, wherein monitoring the actual usage of the resource includes receiving actual usage data from each of the plurality of resource consumption entities and determining accuracy of the corresponding projected resource demand by comparing the corresponding projected resource demand with the actual usage data, the accuracy determined by estimating future resource consumption over the defined time period and calculating any projected shortages or surpluses resulting from the estimating.

19. A method for providing resource management, the resource management provided via a resource management application executing on a computer, the method comprising:

forecasting an amount of a resource that will be generated over a defined time period;

receiving a projected resource demand for the resource from each of a plurality of resource consumption entities;

providing a centralized network hub for the plurality of resource consumption entities and a provider of the resource, the centralized network hub including a user interface component of the resource management application configured to enable end users of the resource consumption entities to engage in an auction for the resource, the end users purchasing blocks of the resource from the provider via the user interface;

wherein each of the resource consumption entities monitors corresponding consumption of the resource throughout the time period; and trading, via the centralized network hub, credits for purchased units of the resource among the end users based upon projected surpluses and projected shortages of the resource in response to the monitoring, wherein the centralized network hub is configured to enable the trading for the duration of the time period.

20. The method of claim 19, wherein the provider is an independent producer of power, and the centralized network hub is implemented as a spot market.

* * * * *